No. 691,752. Patented Jan. 28, 1902.
W. W. DAWLEY.
HATCH COVER.
(Application filed Sept. 28, 1900.)
(No Model.)
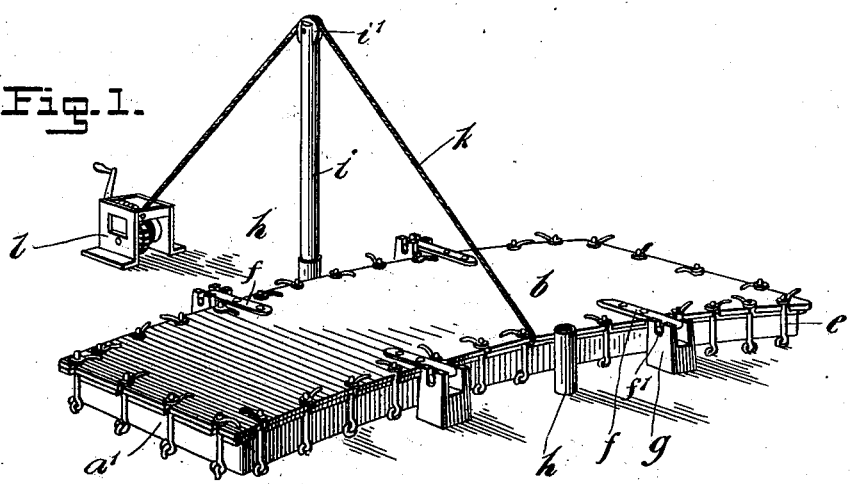
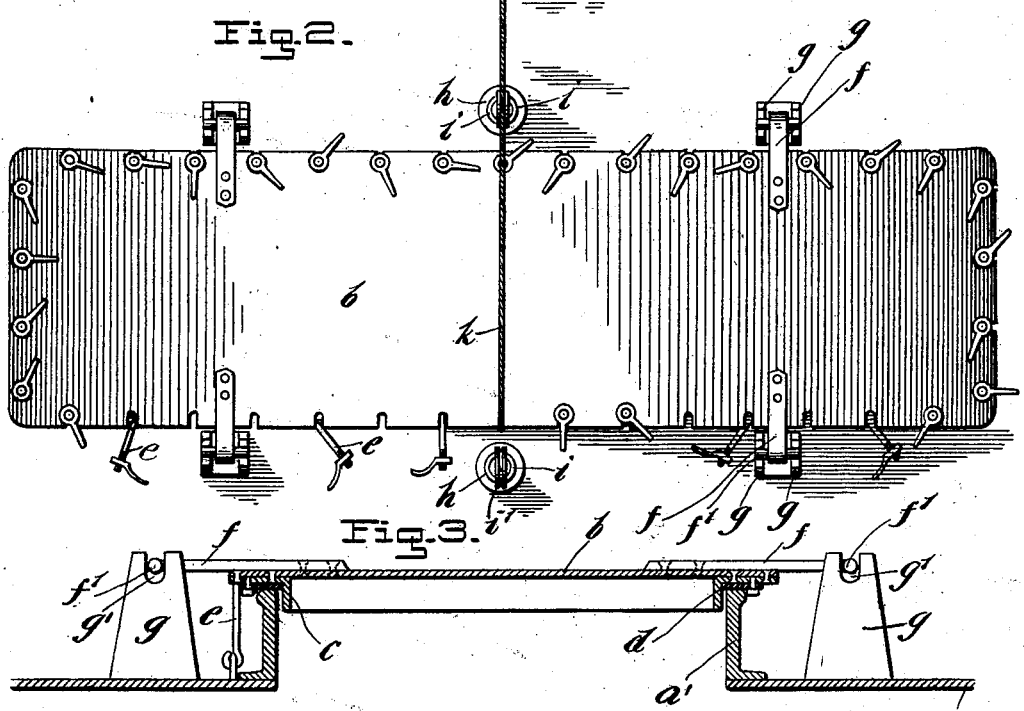
WITNESSES:
INVENTOR
Winfield W. Dawley.
BY
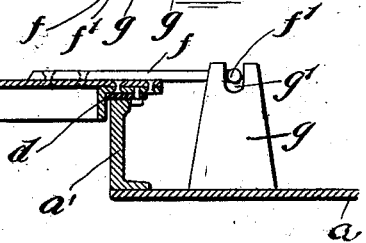
ATTORNEYS

UNITED STATES PATENT OFFICE.

WINFIELD WELLS DAWLEY, OF GENEVA, OHIO.

HATCH-COVER.

SPECIFICATION forming part of Letters Patent No. 691,752, dated January 28, 1902.

Application filed September 28, 1900. Serial No. 31,414. (No model.)

*To all whom it may concern:*

Be it known that I, WINFIELD WELLS DAWLEY, a citizen of the United States, and a resident of Geneva, in the county of Ashtabula and State of Ohio, have invented a new and Improved Hatch-Cover, of which the following is a full, clear, and exact description.

The purpose of this invention is to provide a hatch-cover which when battened down will hermetically seal the hatch and which also, though it may be of large size and great weight, can be readily lifted from the hatch-coaming.

This specification is the disclosure of one form of the invention, while the claim defines the actual scope thereof.

Reference is to be had to the accompanying drawings, forming a part of this specification, in which similar characters of reference indicate corresponding parts in all the views.

Figure 1 is a perspective view of the invention. Fig. 2 is a plan view thereof, and Fig. 3 is a vertical sectional view of the same.

$a$ represents the deck of a vessel, and $a'$ the hatch-coaming.

$b$ represents the hatch-cover, which is preferably constructed of iron and which is provided with an angle-iron $c$, fastened to its under side and extending around the edges thereof, one member of the angle-iron standing vertically and the other member lying snugly along the under side of the hatch-cover, said member being fastened to the hatch-cover by riveting, as shown. A rubber gasket or other packing device $d$ is fastened under the horizontal member of the angle-iron $c$ in position to engage on top of the hatch-coaming $a'$. Swing-bolts $e$ are provided for battening down the hatch, as illustrated in the drawings, and when these bolts are tightened down the hatch-cover is forced against the coaming, and the rubber gasket $d$ hermetically seals the hatch. Each side edge of the hatch is provided with two transversely-projecting arms $f$, rigidly fastened to the hatch and provided at their end portions with trunnions $f'$, which are seated to rock in bearings $g'$, formed in stanchions $g$, erected on the deck. The bearings $g'$ are open at their top, so that the trunnions $f'$ may not only rock in the bearings, but may also be lifted upward out of the same. At each side of the hatch a socket-piece $h$ is fastened to the deck, and this socket-piece is adapted removably to carry in upright position a post $i$, provided at its top with a sheave $i'$, whereover is adapted to pass a line $k$, one end of which is attached to the side edge of the hatch-cover opposite the side at which the post $i$ is located and the other end of which runs down to a suitable winch $l$, mounted on the deck. By operating this winch the hatch-cover may be raised into vertical position, thus opening the hatch, during which operation the hatch swings, with the trunnions $f'$ at one side of the hatch rocking in the corresponding bearings $g'$. It is clear that by shifting the post $i$ and the winch $l$ the hatch may be swung open toward either side. When the hatch swings on the trunnions at one side, the arms $f$ and the trunnions $f'$ at the other side are of course raised upward with the hatch, the trunnions disengaging the bearings $g'$.

In Fig. 2 I have illustrated two posts $i$, each of which is provided with a sheave $i'$; but this obviously is merely a duplication of the post and sheave shown in Fig. 1.

Having thus described my invention, I claim as new and desire to secure by Letters Patent—

The combination with a decked vessel having a hatch and a hatch-coaming therefor, of a hatch-cover extending over and beyond the hatch-coaming, angle-irons fastened to the under side of the cover and having outwardly-extending horizontal members lying snugly against the cover and vertical members extending downward inside of the hatch-coaming, a packing-gasket secured to the under side of the horizontal member of the angle-iron and bearing on the hatch-coaming, transversely-projecting arms fastened to the hatch-cover and extending beyond the same and provided at their ends with trunnions, and stanchions fastened to the deck and having bearings therein for the reception of the trunnions.

In testimony whereof I have signed my name to this specification in the presence of two subscribing witnesses.

WINFIELD WELLS DAWLEY.

Witnesses:
JOHN H. BRIGHAM,
DENNIS DEVAN.